(12) United States Patent
Hsu

(10) Patent No.: US 9,941,769 B2
(45) Date of Patent: Apr. 10, 2018

(54) LINEAR RELUCTANCE MOTOR DEVICE AND ENGINE APPARATUS

(71) Applicants: Fu-Tzu Hsu, Taipei (TW); Chieh-Sen Tu, New Taipei (TW)

(72) Inventor: Fu-Tzu Hsu, Taipei (TW)

(73) Assignees: Fu-Tzu Hsu, Taipei (TW); Chieh-Sen Tu, New Taipei (TW)

( * ) Notice: Subject to any disclaimer, the term of this patent is extended or adjusted under 35 U.S.C. 154(b) by 263 days.

(21) Appl. No.: 14/825,983

(22) Filed: Aug. 13, 2015

(65) Prior Publication Data
US 2016/0049848 A1 Feb. 18, 2016

(30) Foreign Application Priority Data

Aug. 14, 2014 (TW) .............................. 103127896 A

(51) Int. Cl.
| H02K 7/06 | (2006.01) |
| H02K 7/075 | (2006.01) |
| H02K 33/02 | (2006.01) |
| H02P 25/02 | (2016.01) |

(52) U.S. Cl.
CPC ............ *H02K 7/075* (2013.01); *H02K 33/02* (2013.01); *H02P 25/027* (2013.01)

(58) Field of Classification Search
CPC ........ H02K 7/075; H02K 7/065; H02K 41/02; H02K 41/03; H02K 33/02
USPC ......................................................... 310/24
See application file for complete search history.

(56) References Cited

U.S. PATENT DOCUMENTS

| 5,632,259 | A | * | 5/1997 | Konda | F02P 3/02 |
| | | | | | 123/634 |
| 6,049,146 | A | * | 4/2000 | Takara | F03G 7/00 |
| | | | | | 310/23 |
| 7,501,725 | B2 | * | 3/2009 | Parker | H02K 7/06 |
| | | | | | 180/65.1 |
| 7,793,634 | B2 | * | 9/2010 | Elmaleh | F02B 63/04 |
| | | | | | 123/197.1 |
| 9,072,576 | B2 | * | 7/2015 | Nishiura | A61C 17/3445 |
| 9,190,882 | B2 | * | 11/2015 | Baird | H02K 33/00 |
| 9,306,486 | B2 | * | 4/2016 | Silva | F04B 35/045 |
| 9,484,140 | B2 | * | 11/2016 | Francoeur | C21D 8/1272 |
| 2002/0014344 | A1 | * | 2/2002 | Geiger | B25D 11/064 |
| | | | | | 173/114 |
| 2004/0155536 | A1 | * | 8/2004 | Cordiale | H02K 33/14 |
| | | | | | 310/24 |
| 2008/0042497 | A1 | * | 2/2008 | Parker | H02K 7/06 |
| | | | | | 310/24 |
| 2008/0079320 | A1 | * | 4/2008 | Beaulieu | F02B 63/04 |
| | | | | | 310/15 |
| 2011/0127857 | A1 | * | 6/2011 | Kundrat | H02K 53/00 |
| | | | | | 310/24 |
| 2014/0097708 | A1 | * | 4/2014 | Simcox | H02K 33/02 |
| | | | | | 310/24 |

* cited by examiner

*Primary Examiner* — Forrest M Phillips
(74) *Attorney, Agent, or Firm* — Hamre, Schumann, Mueller & Larson, P.C.

(57) ABSTRACT

A reluctance motor includes a ferromagnetic seat, a non-magnetic sleeve sleeved on the seat, a magnetizing coil wound around the sleeve, a magnetic core surrounding the sleeve, a ferromagnetic cover covering the sleeve, and a ferromagnetic pseudo piston partly disposed in the sleeve and axially movable relative to the sleeve.

13 Claims, 12 Drawing Sheets

LINEAR RELUCTANCE MOTOR DEVICE AND ENGINE APPARATUS

CROSS-REFERENCE TO RELATED APPLICATION

This application claims priority of Taiwanese Application No. 103127896, filed on Aug. 14, 2014.

FIELD

The disclosure relates to a reluctance motor, and more particularly to a linear reluctance motor, an engine including the same, and a motor device including the same.

BACKGROUND

Referring to FIG. 1, a conventional reluctance motor 1 includes a stator 11 having eight projecting poles (A, A', B, B', C, C', D, D'), a rotor 12 that is disposed within the stator 11 and that has six salient poles (a, a', b, b', c, c'), and four phase windings that are respectively wound around radially opposite pairs of the projecting poles (A-A', B-B', C-C', D-D') of the stator 11 (hereinafter, phase windings (A", B", C", D") are used). Usually, the four phase windings (A", B", C", D") are sequentially switched to a magnetizing state to cause rotation of the rotor 12. For example, the phase winding (A") may first be switched to the magnetizing state, so that the projecting poles (A, A') generates magnetic force to attract the salient poles (a, a') to move toward the projecting poles (A, A'), as shown in FIG. 1. Then, the phase winding (B") is switched to the magnetizing state, so that the projecting poles (B, B') generates magnetic force to attract the salient poles (a, a') to move toward the projecting poles (B, B'). Similarly, the phase windings (C", D") are sequentially switched to the magnetizing state, so as to drive clockwise rotation of the rotor 12. In contrast, when the phase windings (A", B", C", D") are switched to the magnetizing state in a sequence of (D"), (C"), (B"), and (A"), the rotation of the rotor 12 may be driven in a counterclockwise direction.

The conventional reluctance motor 1 operates by magnetic attraction between the projecting poles (A, A', B, B', C, C', D, D') of the stator 11 and the salient poles (a, a', b, b', c, c') of the rotor 12. However, due to spatial limitation, a number of turns of the phase winding on each projecting pole may be limited (usually less than 100 turns), thereby leading to small reluctance, and requiring a relatively large current to generate sufficient magnetic attraction for driving rotation of the rotor 12. Accordingly, the conventional reluctance motor 1 may not be effectively power-saving.

Referring to FIG. 2, since magnetic power generated by a conventional motor device using the conventional reluctance motor 1 is controlled by current (constant voltage) and since the windings of the reluctance motor are characterized as inductors, counter-electromotive force (Anti-emf), which is denoted using a dashed line in FIG. 2, may be generated during demagnetization of the windings, thereby producing heat that may lead to high temperature of the motor device.

Referring to FIG. 3, since magnetic power generated by a conventional electromagnet is controlled by voltage (constant current) and the winding of the reluctance motor is characterized as an inductor, eddy current, which is denoted using a dashed line in FIG. 3, may be generated during demagnetization of the winding, thereby producing heat.

SUMMARY

Therefore, an object of the disclosure is to provide a reluctance motor that may be relatively power-saving and have high efficiency.

According to the disclosure, the reluctance motor includes a seat, a non-magnetic sleeve, a magnetizing coil, a magnetic core, a cover and a pseudo piston.

The seat is made of a ferromagnetic material, and has an abutment seat surface formed with a protrusion.

The non-magnetic sleeve is made of a non-magnetic material, is sleeved on the protrusion of the seat, and has a sleeve through hole.

The magnetizing coil is wound around the non-magnetic sleeve.

The magnetic core surrounds the non-magnetic sleeve to form a core through hole through which the non-magnetic sleeve passes, is electrically isolated from the magnetizing coil, and has a first end surface abutting against the abutment surface of the seat, and a second end surface opposite to the first end surface.

The cover is made of a ferromagnetic material, is disposed opposite to the seat with respect to the non-magnetic sleeve, abuts against the second end surface of the magnetic core, and is formed with a cover opening in spatial communication with the sleeve through hole.

The pseudo piston is made of a ferromagnetic material, is partly disposed in the sleeve through hole of the non-magnetic sleeve, partly extends out of the cover opening, and is axially movable relative to the non-magnetic sleeve.

According to another aspect of this disclosure is to provide an engine that includes the abovementioned reluctance motor. The engine further includes a transmission mechanism including a crankshaft and a restoring component. The crankshaft is connected to one end of the piston. When the magnetizing coil is enabled to magnetize the magnetic core, the pseudo piston is magnetically attracted by the magnetic core, moves from the initial position toward the seat, and brings the crankshaft into rotation. The restoring component is configured to cause the pseudo piston to return to the initial position when magnetization of the magnetic core is disabled.

According to yet another aspect of this disclosure, there is provided a reluctance motor device that includes the abovementioned engine. The reluctance motor device further includes a driving circuit to be coupled between a positive terminal and a negative terminal of a direct current (DC) power source. The driving circuit includes a first switch disposed to couple an end of said magnetizing coil to the positive terminal of the DC power source, a second switch disposed to couple another end of said magnetizing coil to the negative terminal of the DC power source, a first diode having a cathode that is coupled to said end of said magnetizing coil, and an anode that is disposed to be coupled to the negative terminal of the DC power source, and a second diode having an anode that is coupled to said another end of said magnetizing coil, and a cathode that is disposed to be coupled to the positive terminal of the DC power source.

According to still another aspect of this disclosure, there is provided another engine that includes two of the abovementioned reluctance motors. For each of the reluctance motors, when the magnetizing coil is enabled to magnetize the magnetic core, the pseudo piston is magnetically attracted by the magnetic core and moves from an initial position toward the seat. The another engine further includes a crankshaft including a first crankpin connected to one end of the pseudo piston of one of the reluctance motors, and a second crankpin connected to one end of the pseudo piston of the other one of the reluctance motors. The first and second crankpins are disposed at different angular positions relative to a rotation axis of the crankshaft. When the magnetizing coils of the reluctance motors are enabled to magnetize the magnetic cores by turns, such that the pseudo pistons of the reluctance motors each perform reciprocating motion relative to the non-magnetic sleeve of the corresponding one of the reluctance motors, and bring the crankshaft into continuous rotation.

According to one other aspect of this disclosure, there is provided another reluctance motor device that includes said another engine. The another reluctance motor device further includes a driving circuit to be coupled between a positive terminal and a negative terminal of a direct current (DC) power source. The driving circuit includes a first switch disposed to couple an end of the magnetizing coil of one of the reluctance motors to the positive terminal of the DC power source, a second switch disposed to couple another end of the magnetizing coil of said one of the reluctance motors to the negative terminal of the DC power source, a first diode having a cathode that is coupled to the end of the magnetizing coil of the one of the reluctance motors, and an anode that is disposed to be coupled to the negative terminal of the DC power source, a second diode having an anode that is coupled to the another end of the magnetizing coil of the one of the reluctance motors, and a cathode that is disposed to be coupled to the positive terminal of the DC power source, a third switch disposed to couple an end of the magnetizing coil of the other one of the reluctance motors to the positive terminal of the DC power source, a fourth switch disposed to couple another end of the magnetizing coil of said the other one of the reluctance motors to the negative terminal of the DC power source, a third diode having a cathode that is coupled to the end of the magnetizing coil of said the other one of the reluctance motors, and an anode that is disposed to be coupled to the negative terminal of the DC power source, and a fourth diode having an anode that is coupled to said another end of the magnetizing coil of said the other one of said reluctance motors, and a cathode that is disposed to be coupled to the positive terminal of the DC power source.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
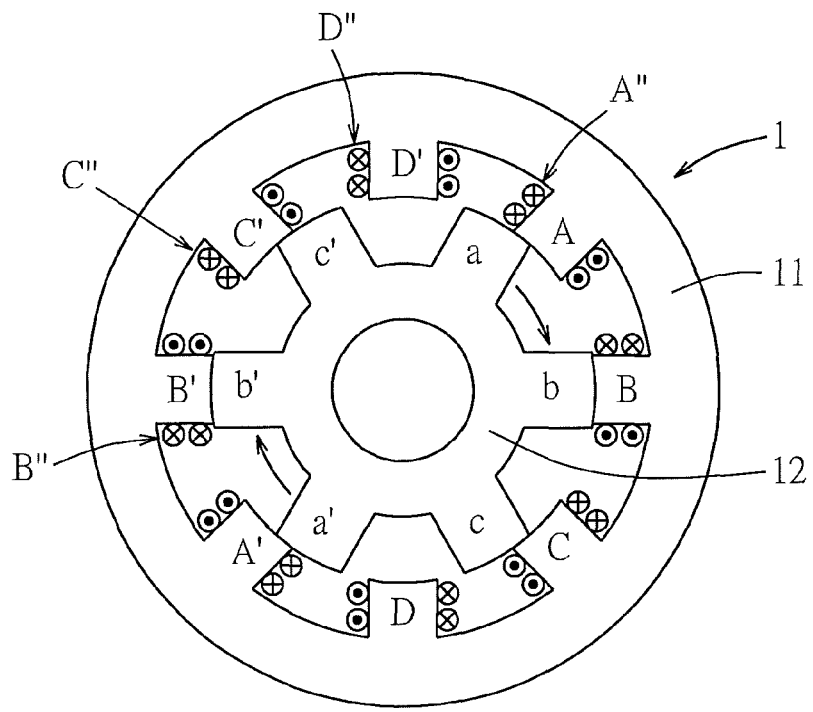
FIG. 1 is a schematic diagram illustrating a conventional reluctance motor.
Figure 2:
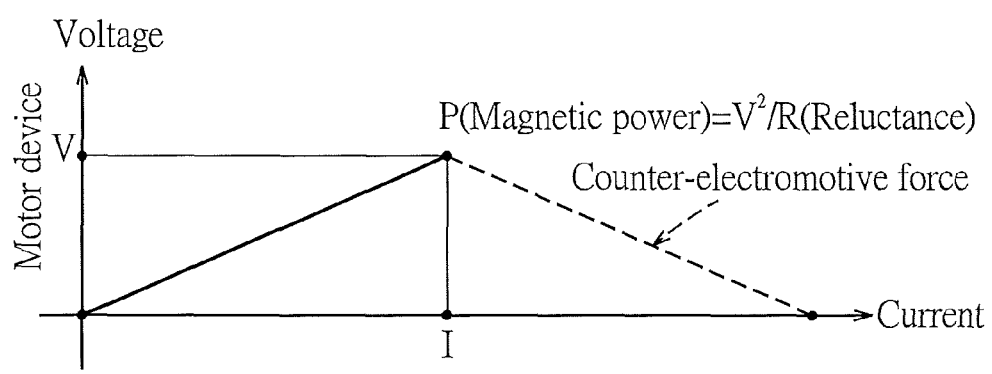
FIG. 2 is a plot roughly illustrating a working curve of a conventional motor device.
Figure 3:
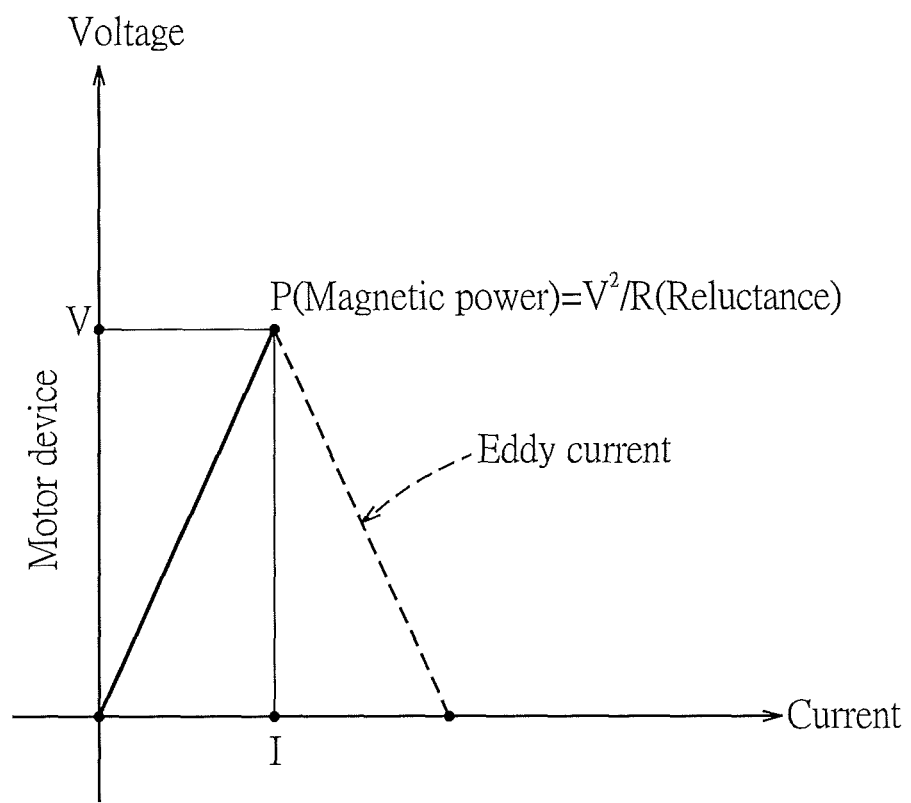
FIG. 3 is a plot roughly illustrating a working curve of a conventional electromagnet.

Before the disclosure is described in greater detail, it should be noted that like elements are denoted by the same reference numerals throughout the disclosure.

Figure 4:
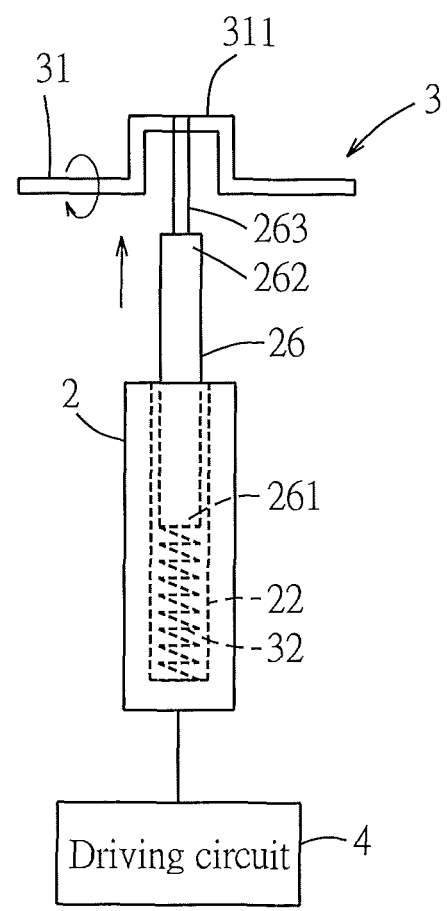
FIG. 4 is a schematic diagram illustrating an exemplary implementation of a first embodiment of a linear reluctance motor device according to this disclosure.
Figure 5:
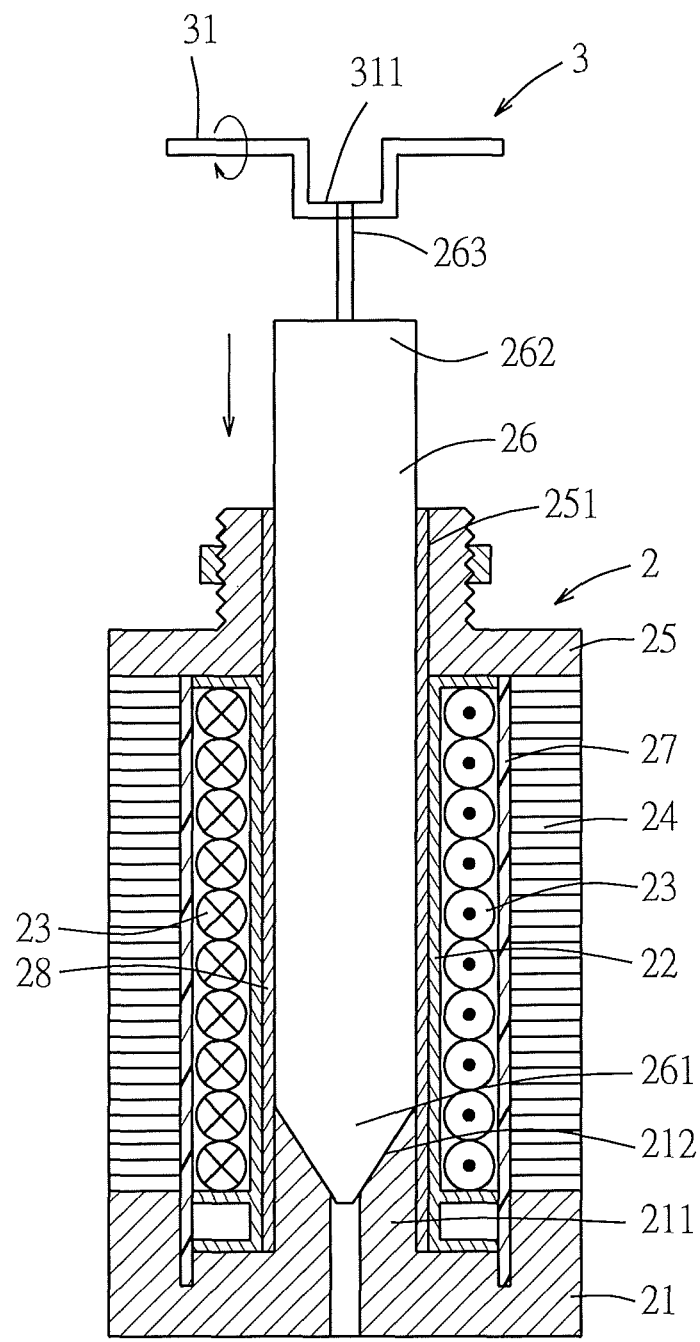
FIG. 5 is a sectional view of the first embodiment, where a restoring component is omitted.

Referring to FIGS. 4 to 7, a first embodiment of a linear reluctance motor device according to this disclosure includes a linear reluctance motor 2, a transmission mechanism 3 and a driving circuit 4. As shown in FIG. 5, the reluctance motor 2 of this embodiment includes a solid seat 21 made of a ferromagnetic material, a non-magnetic sleeve 22 sleeved on the solid seat 21, a magnetizing coil 23 wound around the non-magnetic sleeve 22, a magnetic core 24 surrounding the assembly of the non-magnetic sleeve 22 with the magnetizing coil 23, a solid cover 25 made of a ferromagnetic material, and a solid pseudo piston 26 made of a ferromagnetic material and partly disposed in the non-magnetic sleeve 22. In this embodiment, the solid seat 21 and the solid cover 25 abut against opposite ends of the non-magnetic sleeve 22.

In this embodiment, the solid seat 21 has an abutment seat surface formed with a protrusion 211 at a central position thereof. The protrusion 211 has a concave, substantially conical surface 212. The non-magnetic sleeve 22 may be made of, for example, aluminum or copper, which is non-magnetic, and has an end portion sleeved on the protrusion 211. A turn number of the magnetizing coil 23 wound around the non-magnetic sleeve 22 may range between 500 and 1000 as required. The linear reluctance motor 2 may further include an insulator shell 27 surrounding a portion of the non-magnetic sleeve 22 that is wound by the magnetizing coil 23, to thereby ensure electrical isolation between the magnetic core 24 and the magnetizing coil 23, and protect the magnetizing coil 23 from damage. The magnetic core 24 is formed with a core through hole through which the non-magnetic sleeve 22 passes, and has a first end surface abutting against an outer peripheral portion of the abutment seat surface of the seat 21. In one example, the magnetic core 24 may be a silicon steel lamination, or may be an amorphous magnetic core that is made by rolling a band-shaped amorphous material to thereby obtain a cylindrical magnetic core 24.

The cover 25 abuts against a second end surface of the magnetic core 24 that is opposite to the first end surface, and is formed with a central cover opening 251 aligned and in spatial communication with a central sleeve through hole of the non-magnetic sleeve 22. The pseudo piston 26 has a first end part 261 disposed in the non-magnetic sleeve 22 and facing toward the protrusion 211 of the seat 21, and a second end part 262 opposite to the first end part 261 and extending out of the central cover opening 251. In this embodiment, the first end part 261 is substantially conical and is mated with the surface 212 of the protrusion 211. The pseudo piston 26 is axially movable relative to the non-magnetic sleeve 22 to perform reciprocating motion within the non-magnetic sleeve 22, where the second end 262 repeatedly moves toward and away from the central cover opening 251. In some embodiments, a non-magnetic insulator sleeve 28 may be disposed between the non-magnetic sleeve 22 and the pseudo piston 26 for providing electrical isolation therebetween.

Figure 6:
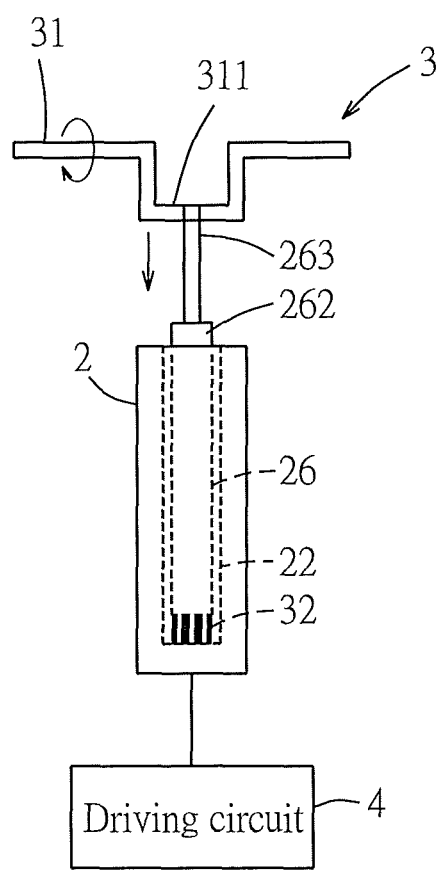
FIG. 6 is a schematic diagram illustrating operation of the first embodiment.

Referring to FIGS. 4 and 5, the transmission mechanism 3 includes a crankshaft 31 pivotally connected to the second end part 262 of the pseudo piston 26, and a restoring component 32. The second end part 262 of the pseudo piston 26 is pivotally connected to a crankpin 311 of the crankshaft 31 via a connecting rod 263. The restoring component 32 may be a compression spring disposed between the first end part 261 of the pseudo piston 26 and the seat 21. Accordingly, when the magnetizing coil 23 is enabled to magnetize the magnetic core 24, the magnetic core 24 magnetically attracts the pseudo piston 26 into the non-magnetic sleeve 22 (i.e., toward the seat 21), as shown in FIG. 6, such that the pseudo piston 26 pulls the crankpin 311 to induce rotation of the crankshaft 31, and compresses the restoring component 32. When the magnetizing coil 23 is refrained from magnetizing the magnetic core 24, the magnetic core 24 is demagnetized and the restoring component 32 applies a restoring force to push the pseudo piston 26 back to an initial position, as shown in FIG. 4, to thereby continue the rotation of the crankshaft 31 in the same direction. As a result, when the magnetizing coil 23 is periodically enabled to magnetize the magnetic core 24 at a specific frequency, the pseudo piston 26 may perform reciprocating motion relative to the non-magnetic sleeve 22, to thereby repeatedly push and pull the crankpin 311, resulting in continuous rotation of the crankshaft 31 in the same direction at a speed associated with the abovementioned specific frequency. As a result, the linear reluctance motor 2 and the transmission mechanism 3 cooperatively function as an engine to convert magnetic energy into mechanical energy.

It is noted that, the restoring component 32 is not limited to being a compression spring disposed between the first end part 261 of the pseudo piston 26 and the seat 21. Any arrangement that permits the restoring component 32 to reposition the pseudo piston 26 back to the initial position may be applicable in other embodiments.

Figure 7:
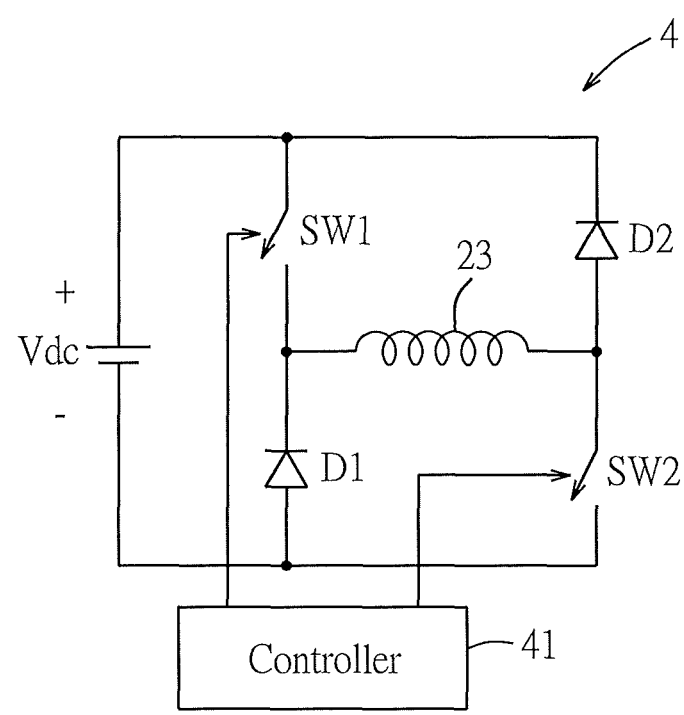
FIG. 7 is a circuit block diagram illustrating a driving circuit of the first embodiment.

Further referring to FIG. 7, the driving circuit 4 is electrically coupled to the magnetizing coil 23 for periodically enabling the magnetizing coil 23 to magnetize the magnetic core 24. In this embodiment, the driving circuit 4 is coupled to a DC (direct current) power source (Vdc), and includes a first switch (SW1), a second switch (SW2), a first diode (D1), a second diode (D2) and a controller 41. The first switch (SW1) is electrically coupled between a positive terminal of the DC power source (Vdc) and a first terminal of the magnetizing coil 23. The second switch (SW2) is electrically coupled between a negative terminal of the DC power source (Vdc) and a second terminal of the magnetizing coil 23. The first diode (D1) has a cathode electrically coupled to the first terminal of the magnetizing coil 23, and an anode electrically coupled to the negative terminal of the DC power source (Vdc). The second diode (D2) has an anode electrically coupled to the first terminal of the magnetizing coil 23, and an anode electrically coupled to the positive terminal of the DC power source (Vdc).

The controller 41 periodically controls the first and second switches (SW1, SW2) to simultaneously conduct or not conduct at the specific frequency. When the first and second switches (SW1, SW2) simultaneously conduct, the DC power source (Vdc) provides electricity to the magnetizing coil 23 through the first and second switches (SW1, SW2) to magnetize the magnetic core 24. When the first and second switches (SW1, SW2) simultaneously do not conduct, the DC power source (Vdc) stops provision of electricity to the magnetizing coil 23, the magnetizing coil 23 stops magnetizing the magnetic core 24, and the magnetic core 24 is demagnetized. Through such control, the magnetizing coil 23 may be periodically enabled to magnetize the magnetic core 24 at the specific frequency, such that the pseudo piston 26 is continuously reciprocated within the non-magnetic sleeve 22, and the crankshaft 31 is brought into continuous rotation in a specific direction at a rotational speed corresponding to the specific frequency. As a result, the linear reluctance motor device functions as a conventional motor device to convert electrical energy into mechanical energy.

Since the number of turns of the magnetizing coil 23 is more than that of the conventional reluctance motor, the reluctance thus generated is relatively large, and less current is required to cause the magnetic core 24 to generate sufficient magnetic attraction to attract the pseudo piston 26 into the non-magnetic sleeve 22 for bringing the crankshaft 31 into rotation, as such power saving is achieved.

Figure 8:
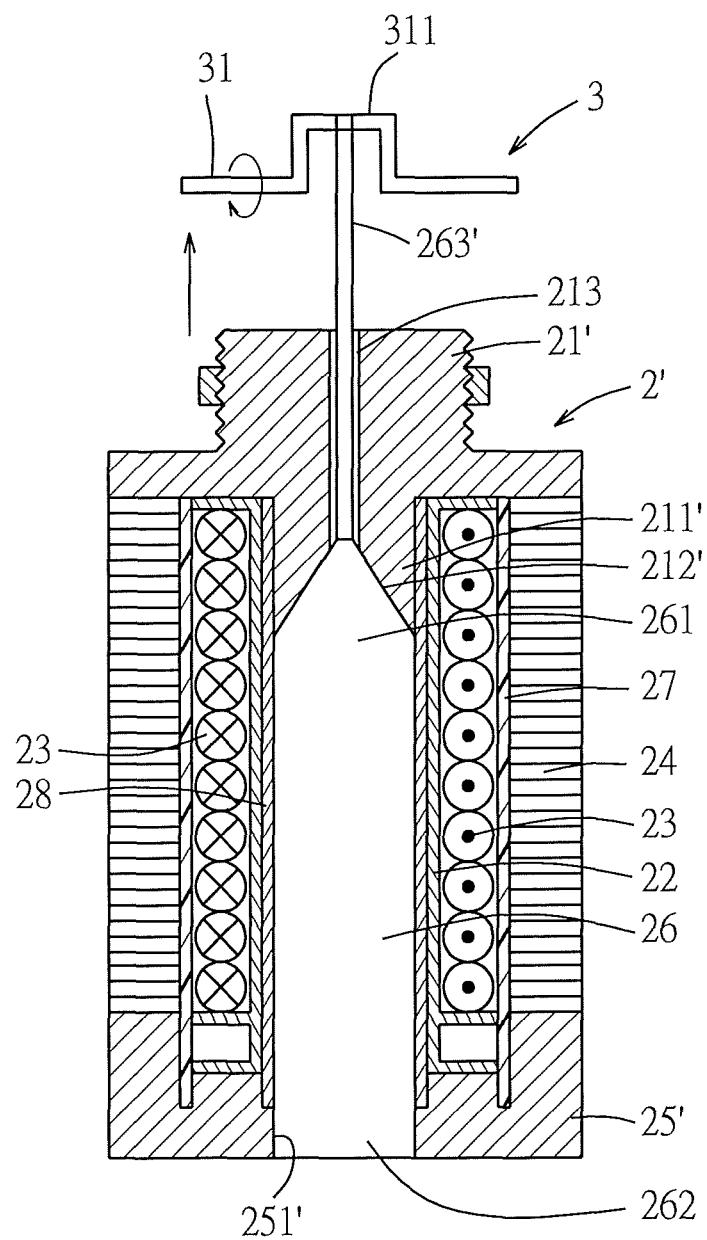
FIG. 8 is a sectional view illustrating another exemplary implementation of the first embodiment, where a restoring component is omitted.

Referring to FIG. 8, another exemplary implementation of a linear reluctance motor 2' according to this disclosure differs from the abovementioned linear reluctance motor 2 (see FIG. 5) in that: while the linear reluctance motor 2' includes a seat 21' and a cover 25' have similar configuration to the seat 21 and the cover 22 of the linear reluctance motor 2, the seat 21' and the cover 25' are disposed at opposite positions as compared to those of the linear reluctance motor 2; that is, the seat 21' and the cover 25' respectively abut against the second and first end surfaces of the magnetic core 24. In detail, the seat 21' has a protrusion 211' at a central position thereof. The protrusion 211' has a concave, substantially conical surface 212', and is formed with a central channel 213 axially passing through the seat 21'. The cover 25' is formed with a central cover opening 251'. The pseudo piston 26 is placed into the non-magnetic sleeve 22 via the central cover opening 251' with the first end part 261 facing toward the protrusion 211' of the seat 21'. The first end part 261 of the pseudo piston 26 is pivotally connected to the crankpin 311 of the crankshaft 31 via a connecting rod 263' passing through the channel 213. Similarly, when the magnetizing coil 23 is periodically enabled to magnetize the magnetic core 24 and cooperates with the restoring component 32 (see FIG. 4), the pseudo piston 26 may be continuously reciprocated to pull and push the crankpin 311 of the crankshaft 31, so that the crankshaft 31 continuously rotates in the same direction. As a result, the linear reluctance motor device functions as a conventional motor device to convert electrical energy into mechanical energy.

In some embodiments, the protrusion 211, 211' of the abovementioned linear reluctance motors 2, 2' and the first end part 261 of the pseudo piston 26 may have planar end surfaces to achieve better transient magnetic attraction when applying to a motor device.

Figure 9:
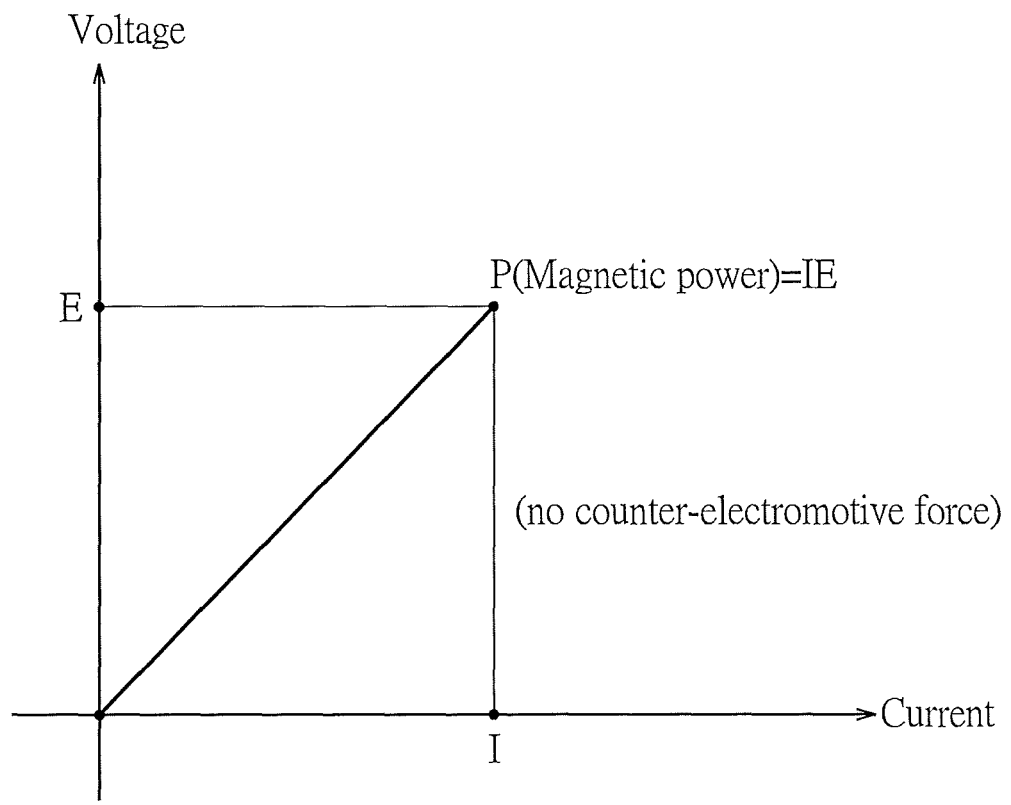
FIG. 9 is a plot roughly illustrating a working curve of the first embodiment.

Referring to FIG. 9, magnetic power of the magnetizing coil 23 of the linear reluctance motor 2, 2' of this embodiment is determined by both voltage and current under control of the driving circuit 4, so that the magnetizing coil 23 is characterized as a reluctor, and only does actual work and theoretically does not do virtual work. By virtue of the driving circuit 4, generation of the counter-electromotive force (Anti-emf) is depressed by the diodes (D1, D2) when the switches (SW1, SW2) are open, thereby reducing generation of heat, and preventing the linear reluctance motor 2, 2' from reaching a high temperature during operation.

Figure 10:
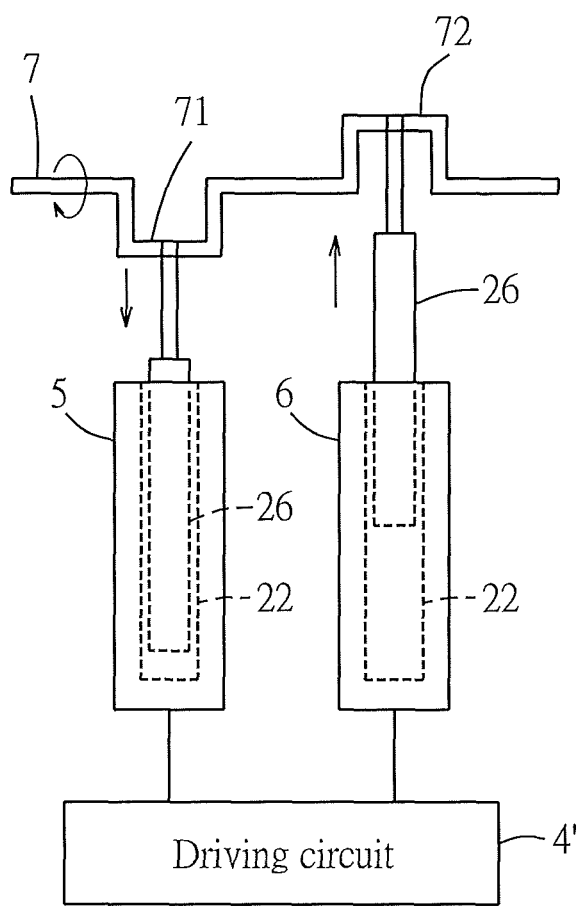
FIG. 10 is a schematic diagram illustrating a second embodiment of a linear reluctance motor device according to this disclosure.

Referring to FIG. 10, a second embodiment of a linear reluctance motor device according to this disclosure differs from the first embodiment in that: this embodiment includes two linear reluctance motors 5, 6, a transmission mechanism 7 and a driving circuit 4'. Each of the linear reluctance motors 5, 6 may have the same structure as either the linear reluctance motor 2 (see FIG. 5) or the linear reluctance motor 2' (see FIG. 8), and details thereof are not repeated herein for the sake of brevity. In FIG. 10, the linear reluctance motors 5, 6 are exemplified using the reluctance motor 2 of FIG. 5. In this embodiment, the transmission mechanism 7 is a crankshaft including a first crankpin 71 and a second crankpin 72 disposed at different (e.g., opposite) angular positions relative to a rotation axis of the crankshaft 7. The second end part 262 (see FIG. 5) (in a case where the reluctance motor 5 has the configuration as shown in FIG. 8, it would be the first end part 261) of the pseudo piston 26 of the linear reluctance motor 5 is pivotally connected to the first crankpin 71, and the second end part 262 (in a case where the reluctance motor 6 has the configuration as shown in FIG. 8, it would be the first end part 261) of the pseudo piston 26 of the reluctance motor 6 is pivotally connected to the second crankpin 72.

Figure 11:
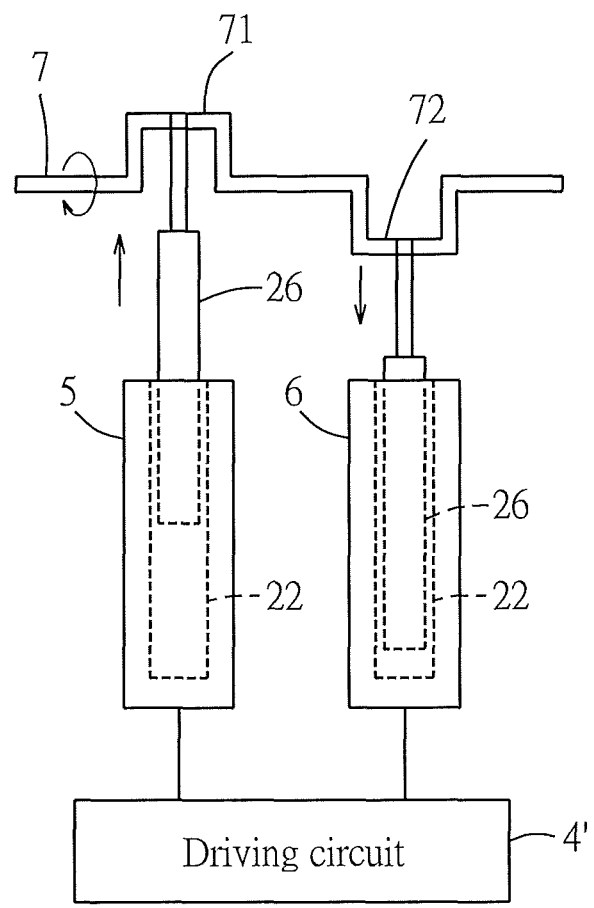
FIG. 11 is a schematic diagram illustrating operation of the second embodiment.

Through the transmission mechanism 7 having the crankshaft structure so configured, when the pseudo piston 26 of the linear reluctance motor 5 moves into the non-magnetic sleeve 22 of the linear reluctance motor 5, the crankshaft is brought into rotation, and the pseudo piston 26 of the linear reluctance motor 6 is pulled out of the non-magnetic sleeve 22 of the linear reluctance motor 6. Then, referring to FIG. 11, when the pseudo piston 26 of the linear reluctance motor 6 moves into the non-magnetic sleeve 22 of the linear reluctance motor 6 in turn, the crankshaft continuously rotates in the same rotation due to inertia, and the pseudo piston 26 of the linear reluctance motor 5 is pulled out of the non-magnetic sleeve 22 of the linear reluctance motor 5. Accordingly, when the magnetizing coils 23 (see FIG. 5) of the linear reluctance motors 5, 6 take turns in being enabled to magnetize the corresponding magnetic cores 24, the pseudo pistons 26 of the linear reluctance motors 5, 6 cause each other to perform reciprocating motions via the crankshaft, and bring the crankshaft into continuous rotation. As a result, the linear reluctance motors 5, 6 and the transmission mechanism 7 cooperatively function as an engine to convert magnetic energy into mechanical energy. In this embodiment, since movement of one pseudo piston 26 into the non-magnetic sleeve 22 may bring about opposite movement of the other pseudo piston 26 via the crankshaft, opposite reciprocating motions of the two pseudo pistons 26 may be achieved by alternately magnetizing the magnetic cores 24, so that the restoring component 32 for the first embodiment (see FIG. 4) is not required in this embodiment.

Figure 12:
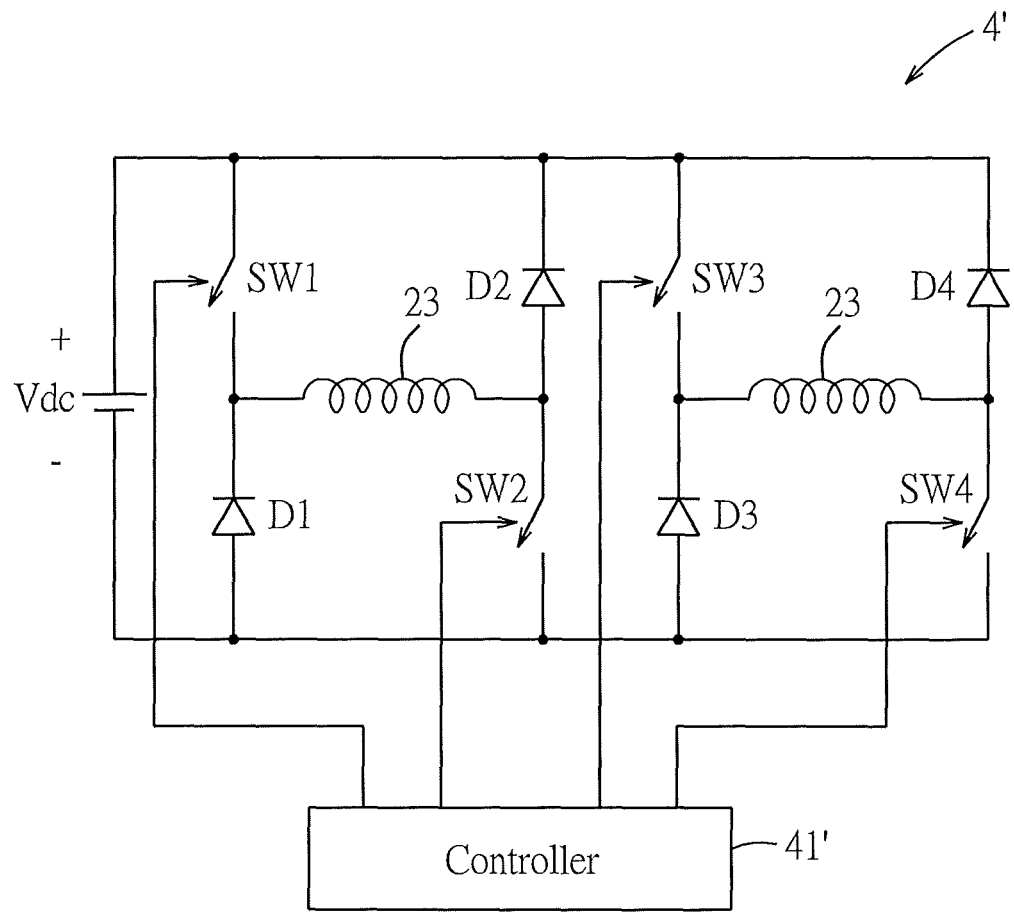
FIG. 12 is a circuit block diagram illustrating a driving circuit of the second embodiment.

Referring to FIG. 12, the driving circuit 4' of this embodiment is coupled between a positive terminal and a negative terminal of a DC power source (Vdc), and includes first to fourth switches (SW1, SW2, SW3, SW4), first to fourth diodes (D1, D2, D3, D4) and a controller 41'. The first switch (SW1) is coupled between a first end of the magnetizing coil 23 (see FIG. 5) of the linear reluctance motor 5 and the positive terminal of the DC power source (Vdc). The second switch (SW2) is coupled between a second end of the magnetizing coil 23 of the linear reluctance motor 5 and the negative terminal of the DC power source (Vdc). The first diode (D1) has a cathode coupled to the first end of the magnetizing coil 23 of the linear reluctance motor 5, and an anode coupled to the negative terminal of the DC power source (Vdc). The second diode (D2) has an anode coupled to the second end of the magnetizing coil 23 of the linear reluctance motor 5, and a cathode coupled to the positive terminal of the DC power source (Vdc). The third switch (SW3) is coupled between a first end of the magnetizing coil 23 of the linear reluctance motor 6 and the positive terminal of the DC power source (Vdc). The fourth switch (SW4) is coupled to a second end of the magnetizing coil 23 of the linear reluctance motor 6 and the negative terminal of the DC power source (Vdc). The third diode (D3) has a cathode coupled to the first end of the magnetizing coil 23 of the linear reluctance motor 6, and an anode coupled to the negative terminal of the DC power source (Vdc). The fourth diode (D4) has an anode coupled to the second end of the magnetizing coil 23 of the linear reluctance motor 6, and a cathode coupled to the positive terminal of the DC power source (Vdc).

The controller 41' performs a first operation to control the first and second switches (SW1, SW2) to conduct simultaneously, and a second operation to control the third and fourth switches (SW3, SW4) to conduct simultaneously, and performs the first and second operations by turns. In other words, when the first and second switches (SW1, SW2) conduct, the third and fourth switches (SW3, SW4) do not conduct. Similarly, when the third and fourth switches (SW3, SW4) conduct, the first and second switches (SW1, SW2) do not conduct. In such a manner, the DC power source (Vdc) alternately provides electricity to the magnetizing coils 23 of the linear reluctance motors 5, 6, so as to magnetize the magnetic cores 24 (see FIG. 5) by turns, and to result in alternate reciprocating motions of the pseudo pistons 26 with opposite movements in the respective non-magnetic sleeves 22. The alternate reciprocating motions of the pseudo pistons 26 may bring the crankshaft into continuous rotation in the same direction, so that the linear reluctance motor device of this embodiment functions as a conventional motor device to convert the electrical energy into mechanical energy.

Figure 13:
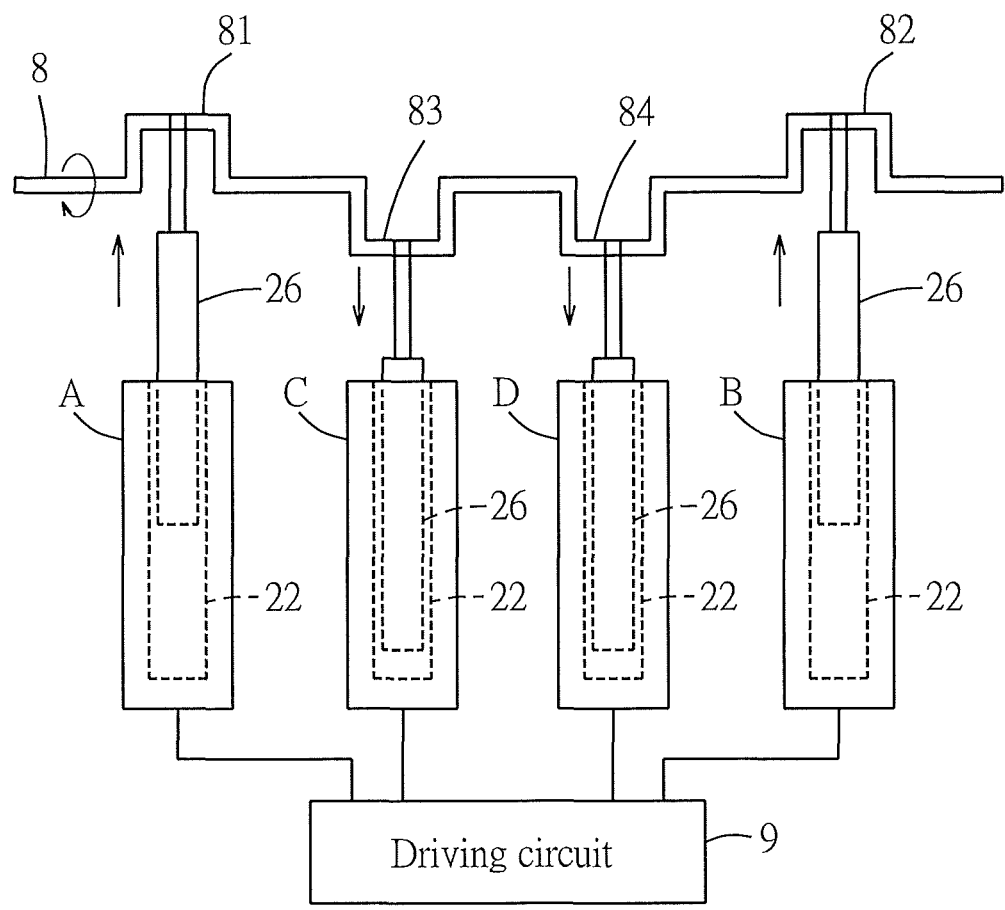
FIG. 13 is a schematic diagram illustrating a third embodiment of a linear reluctance motor device according to this disclosure.

Referring to FIG. 13, a third embodiment of a linear reluctance motor device according to this disclosure is shown to differ from the second embodiment in that: this embodiment includes four linear reluctance motors (A, B, C, D), a transmission mechanism 8 and a driving circuit 9. Each of the linear reluctance motors (A, B, C, D) has the same structure as either the linear reluctance motor 2 (see FIG. 5) or the linear reluctance motor 2' (see FIG. 8), and details thereof are not repeated herein for the sake of brevity. The transmission mechanism 8 is a crankshaft including two first crankpins 81, 82 that are disposed at the same first angular position relative to a rotation axis of the crankshaft, and two second crankpins 83, 84 that are disposed at the same second angular position relative to the rotation axis of the crankshaft. In this embodiment, the first and second angular positions are opposite to each other. The pseudo pistons 26 of the linear reluctance motors (A, B) are respectively and pivotally connected to the first crankpins 81, 82, and the pseudo pistons 26 of the linear reluctance motors (C, D) are respectively and pivotally connected to the second crankpins 83, 84. The driving circuit 9 operates similarly to the driving circuit 4' (see FIG. 12) of the second embodiment. That is, the abovementioned first operation is applied to the linear reluctance motors (A, B), and the abovementioned second operation is applied to the linear reluctance motors (C, D). The driving circuit 9 performs the first operation on the linear reluctance motors (A, B) and the second operation on the linear reluctance motors (C, D) by turns, such that when the linear reluctance motors (A, B) are simultaneously activated (i.e., being provided with electricity by the driving circuit 9), the linear reluctance motors (C, D) are deactivated (i.e., no electricity is provided thereto), and when the linear reluctance motors (C, D) are simultaneously activated, the linear reluctance motors (C, D) are deactivated. In such a manner, the linear reluctance motors (A, B) and the linear reluctance motors (C, D) alternately drive rotation of the transmission mechanism 8 (i.e., the crankshaft), and the linear reluctance motor device of this embodiment functions as a conventional motor device to convert electrical energy into mechanical energy.

In summary, the linear reluctance motor of each embodiment according to this disclosure use the magnetizing coil to magnetize the magnetic core, and the magnetic core thus generates magnetic attraction to result in reciprocating linear motion of the pseudo piston, so as to bring the crankshaft into rotation. In addition, by controlling the driving circuit to activate the linear reluctance motor(s) at an appropriate frequency, a rotational speed of the crankshaft may be controlled as desired. As a result, the linear reluctance motor device of each embodiment according to this disclosure functions as a conventional motor device to convert electrical energy into mechanical energy, and achieve power saving and high efficiency.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A reluctance motor comprising:
   a seat made of a ferromagnetic material, and having an abutment seat surface that is formed with a protrusion;
   a non-magnetic sleeve made of a non-magnetic material, sleeved on said protrusion of said seat, and having a sleeve through hole;
   a magnetizing coil wound around said non-magnetic sleeve;
   a magnetic core surrounding said non-magnetic sleeve to form a core through hole through which said non-magnetic sleeve passes, being electrically isolated from said magnetizing coil, and having a first end surface that abuts against said abutment surface of said seat and a second end surface that is opposite to said first end surface;
   a cover made of a ferromagnetic material, disposed opposite to said seat with respect to said non-magnetic sleeve, abutting against said second end surface of said magnetic core, and formed with a cover opening that is in spatial communication with said sleeve through hole; and
   a pseudo piston made of a ferromagnetic material, partly disposed in said sleeve through hole of said non-magnetic sleeve, partly extending out of said cover opening, and being axially movable relative to said non-magnetic sleeve.

2. The reluctance motor of claim 1, wherein, when said magnetizing coil is enabled to magnetize said magnetic core, said pseudo piston is magnetically attracted by said magnetic core and moves from an initial position toward said seat.

3. The reluctance motor of claim 2, further comprising a restoring component configured to cause said pseudo piston to be disposed at the initial position when said pseudo piston is not magnetically attracted by said magnetic core.

4. The reluctance motor of claim 1, wherein said magnetic core is constituted by one of a silicon steel lamination, and an amorphous material banded to form a tube.

5. The reluctance motor of claim 1, further comprising a compression spring disposed in said non-magnetic sleeve between said seat and said pseudo piston.

6. An engine comprising:
   a reluctance motor of claim 1, and
   a transmission mechanism including:
      a crankshaft connected to one end of said pseudo piston, wherein when said magnetizing coil is enabled to magnetize said magnetic core, said pseudo piston is magnetically attracted by said magnetic core, moves from the initial position toward said seat, and brings said crankshaft into rotation; and
      a restoring component configured to cause said pseudo piston to return to the initial position when magnetization of said magnetic core is disabled.

7. The engine as claimed in claim 6, wherein said magnetizing coil is alternately enabled to magnetize said magnetic core and disabled from magnetizing said magnetic core such that said pseudo piston continuously brings said crankshaft into rotation.

8. The engine of claim 6, wherein said restoring component is a compression spring disposed in said non-magnetic sleeve between said seat and said pseudo piston.

9. An engine comprising:
   two reluctance motors of claim 1, wherein, for each of said reluctance motors, when said magnetizing coil is enabled to magnetize said magnetic core, said pseudo piston is magnetically attracted by said magnetic core and moves from an initial position toward said seat; and
   a crankshaft including a first crankpin connected to one end of said pseudo piston of one of said reluctance motors, and a second crankpin connected to one end of said pseudo piston of the other one of said reluctance motors, said first and second crankpins being disposed at different angular positions relative to a rotation axis of said crankshaft;
   wherein, when said magnetizing coils of said reluctance motors are enabled to magnetize said magnetic cores by turns, such that said pseudo pistons of said reluctance motors each perform reciprocating motion relative to said non-magnetic sleeve of the corresponding one of said reluctance motors, and bring said crankshaft into continuous rotation.

10. A reluctance motor device comprising:
    an engine of claim 6; and
    a driving circuit to be coupled between a positive terminal and a negative terminal of a direct current (DC) power source, and including:
       a first switch disposed to couple an end of said magnetizing coil to the positive terminal of the DC power source;
       a second switch disposed to couple another end of said magnetizing coil to the negative terminal of the DC power source;
       a first diode having a cathode that is coupled to said end of said magnetizing coil, and an anode that is disposed to be coupled to the negative terminal of the DC power source; and
       a second diode having an anode that is coupled to said another end of said magnetizing coil, and a cathode that is disposed to be coupled to the positive terminal of the DC power source.

11. The reluctance motor device of claim 9, further comprising a controller configured to control said first and second switches to conduct simultaneously, such that the DC power source provides a current to said magnetizing coil through said first and second switches for magnetizing said magnetic core, and to control said first and second switches to simultaneously not conduct, so as to disable magnetization of said magnetic core.

12. A reluctance motor device, comprising:
an engine of claim 8; and
a driving circuit to be coupled between a positive terminal and a negative terminal of a direct current (DC) power source, and including:
a first switch disposed to couple an end of said magnetizing coil of one of said reluctance motors to the positive terminal of the DC power source;
a second switch disposed to couple another end of said magnetizing coil of said one of said reluctance motors to the negative terminal of the DC power source;
a first diode having a cathode that is coupled to said end of said magnetizing coil of said one of said reluctance motors, and an anode that is disposed to be coupled to the negative terminal of the DC power source;
a second diode having an anode that is coupled to said another end of said magnetizing coil of said one of said reluctance motors, and a cathode that is disposed to be coupled to the positive terminal of the DC power source;
a third switch disposed to couple an end of said magnetizing coil of the other one of said reluctance motors to the positive terminal of the DC power source;
a fourth switch disposed to couple another end of said magnetizing coil of said the other one of said reluctance motors to the negative terminal of the DC power source;
a third diode having a cathode that is coupled to said end of said magnetizing coil of said the other one of said reluctance motors, and an anode that is disposed to be coupled to the negative terminal of the DC power source; and
a fourth diode having an anode that is coupled to said another end of said magnetizing coil of said the other one of said reluctance motors, and a cathode that is disposed to be coupled to the positive terminal of the DC power source.

13. The reluctance motor device of claim 12, further comprising a controller configured to perform a first operation to control said first and second switches to conduct simultaneously, to perform a second operation to control said third and fourth switches to conduct simultaneously, and to perform the first and second operations by turns, such that the DC power source alternately provides electricity to said magnetic coils of said reluctance motors, and such that said magnetic cores are magnetized by turns.

* * * * *